US006918064B2

(12) United States Patent
Mueller et al.

(10) Patent No.: US 6,918,064 B2
(45) Date of Patent: Jul. 12, 2005

(54) METHOD AND DEVICE FOR MONITORING CONTROL UNITS

(75) Inventors: Margit Mueller, Asperg (DE); Lilian Kaiser, Stuttgart (DE); Stefan Keller, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 540 days.

(21) Appl. No.: 10/101,820

(22) Filed: Mar. 20, 2002

(65) Prior Publication Data

US 2002/0194551 A1 Dec. 19, 2002

(30) Foreign Application Priority Data

Mar. 21, 2001 (DE) .......................................... 101 13 917

(51) Int. Cl.[7] .............................................. G06F 11/00
(52) U.S. Cl. ........................................... 714/43; 714/49
(58) Field of Search ............................. 714/43, 47, 48, 714/49, 51

(56) References Cited

U.S. PATENT DOCUMENTS 5,111,460 A * 5/1992 Botzenhardt et al. .......... 714/57
6,356,813 B1 * 3/2002 Sommer et al. ................ 701/1
6,549,972 B1 * 4/2003 Berstis et al. ................ 710/311

FOREIGN PATENT DOCUMENTS

DE         44 38 714        5/1996
DE         195 29 434       2/1997
DE         196 53 429       7/1998
WO         WO 97/3083       9/1997

OTHER PUBLICATIONS

CAN Specification, Version 2.0, Robert Bosch GMBH, 1991.

ISO/TC Standard 22/SC 3 N 11898, 1999.

* cited by examiner

*Primary Examiner*—Nadeem Iqbal
*Assistant Examiner*—Timothy M. Bonura
(74) *Attorney, Agent, or Firm*—Kenyon & Kenyon

(57) ABSTRACT

A method and a device for monitoring data and the transmission of data between at least one first control unit and one second control unit are provided. The at least two control units have a first program level, to which are allocated programs which calculate the control function, as well as a second program level including programs that monitor the functional reliability of the programs of the first program level. The first control unit is connected to at least one component which may be used to acquire data, for example, controlled variables. The data acquired by the component or further data determined with this data may be transmitted from the first control unit to the second control unit over a single connection in a secure manner, and the data and the data transmission are secured separately in the first and second program levels such that errors in the data and the data transmission may be detected.

14 Claims, 3 Drawing Sheets

METHOD AND DEVICE FOR MONITORING CONTROL UNITS

FIELD OF THE INVENTION

The present invention relates to a method and a device for monitoring control units.

BACKGROUND INFORMATION

German Published Patent Application No. 44 38 714 A1 describes an intrinsically safe control unit, e.g., in combination with control systems for controlling the drive unit of a motor vehicle. Intrinsically safe here means that when an error occurs, the error state remains limited to the system in which it occurred, and the system always remains in a secure state with respect to the outside. For example, individual errors must not lead to an increase in power at the drive unit. The watchdog concept described in the German Published Patent Application No. 44 38 714 A1 is a double-redundant structure, i.e., all safety-relevant paths are secured by redundant channels. This is also true of the safety-relevant portions of the operative software, i.e., for example, the software for fulfilling the function of the control unit. This software implementing the controller functions is monitored in a second program level by redundant software which quantitatively checks the correct formation of the control signal quantities by the operative software. In other words, the software of the second level implements the watchdog functions of the first software level. The sequence and the functionality of the second software level are monitored by communication with an external watchdog module as part of a inquiry/response communication. In concrete terms, the first software level in the conventional embodiment contains the operative software for implementing the control function as well as system-specific watchdog functions of the input quantities and the output stages. The second level has the watchdog functions. In the watchdog functions, the correct formation of the output quantities, for example the performance-determining quantities, are monitored by redundant functions. In addition, the programs of the second level formulate the response to a selected inquiry relayed by the watchdog module as part of a debugging function with the help of which the correct calculation of the watchdog functions is checked and they perform a computer monitoring by a test of the watchdog functions by simulation data. Finally, the third level contains the inquiry/response communication (based on the inquiry relayed and the response formulated) together with the watchdog module with the help of which the functioning of the programs of the second level is monitored. Furthermore, watchdog functions are allocated to this level for checking the components of the function computer, such as the memory, analog/digital converter, etc.

Modern control systems generally use multiple control units which are separate components or are structurally combined in one device. Thus, for example, modern vehicle control systems use controllers for controlling the drive unit, for controlling driving performance (ABS, ASC, ESP), for controlling an automatic transmission, for controlling the wheel brakes, etc.

Redundancies are usually provided in a safety system of a multiple controller concept. Thus, for example, individual components which supply data for further processing in the controllers or control units are usually connected directly to all the control units which require or further process the data supplied by the components in such a safety concept. These may be sensors, for example, as well as actuators which supply an acknowledging message regarding operating states.

SUMMARY OF THE INVENTION

The object of this invention is to define a transmission to one or more controllers or control units for the data or information from these components, said transmission conforming to today's security standards, to make it possible for the component supplying the data to be connectable to only one control unit.

According to this present invention, a method of monitoring data and the transmission of data between at least one first control unit and one second control unit within the context of a controller interconnection is described, the at least two control units may have a first program level to which are allocated programs which calculate the control functions, as well as having a second program level including programs that monitor the functional reliability of the programs of the first program level, the first control unit being connected to at least one component which may be used to acquire data, for example controlled variables. The data acquired by the component or the data determined with this data may be transmitted from the first control unit to the second control unit over a single connection in a secure manner, the data and the data transmission being secured separately in the first and second program levels such that errors in the data and the data transmission may be detectable.

Thus, to maintain redundancy despite the connection of at least one component to only one controller, two parallel signal paths are defined, one being equipped with special security mechanisms.

The minimal hardware complexity in connecting the control units may be advantageous here, because a single connection is sufficient to achieve redundancy due to the security according to the present invention in the first and second program levels of the data or data transmission. The implementation of a multiple controller operation with minimal hardware connections between the control units may be accomplished over only one CAN bus, for example. The CAN bus or the CAN bus protocol having the properties specified in the description is described in "CAN Specification, Version 2.0, Robert Bosch GmbH," (1991), and in the ISO/TC Standard 22/SC 3 N 11898 (1999).

Certain elements or components, for example those which determine performance, may nevertheless be connected only to one of the at least two control units. The monitoring defined in the related art may then be performed over this connection according to the present invention.

The security in the first program level may be achieved by analysis of the status information of a corresponding CAN message containing the data. The security in the second program level of the first control unit may be achieved by adding security information to the respective data and/or by using a message counter, where the received message may be checked for consistency and to see whether it is up-to-date.

When an error in the data in the data transmission or an error in the data itself is detected, an error response may be triggered by which a secure state may be set in the second controller or the second control unit. The error response may be such that errors in the first controller or the first control unit do not lead to an undetected power increase in another controller or another control unit.

DETAILED DESCRIPTION

Figure 1:
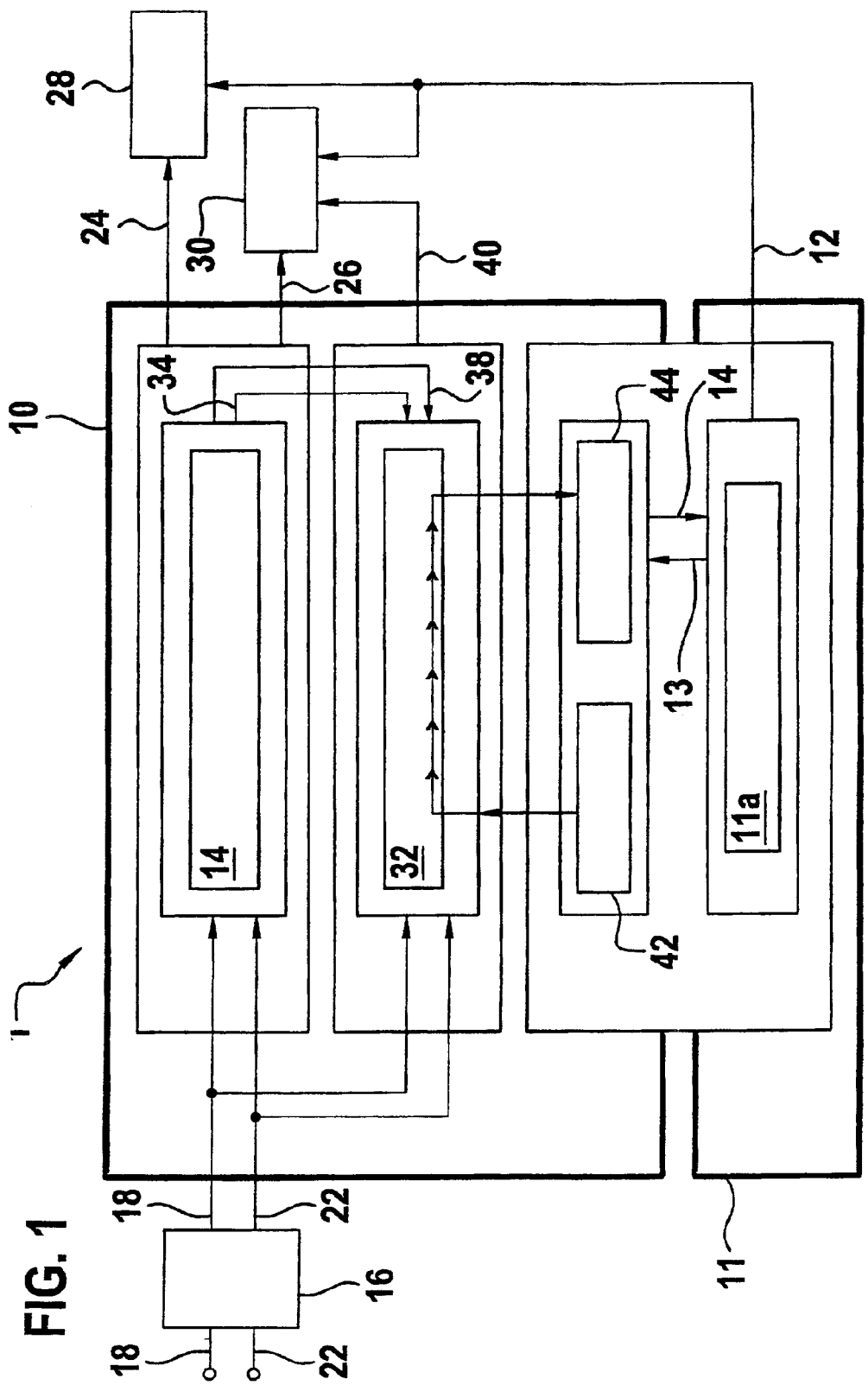
FIG. 1 illustrates a control unit having the watchdog concept exemplified in German Published Patent Application No. 44 38 714 A1.

FIG. 1 illustrates a controller 1 having a control unit 10 and a watchdog module 11. In an example embodiment, this controller 1 may be used to control an internal combustion engine. Controller 1 includes a control unit 10 and a watchdog module 11 which may be allocated to program levels 1, 2 and 3. Likewise, controller 1 may include a computer having program levels 1 (or I) through 3 (or III) on the whole, so that the watchdog module and respective level 3 may be integrated into the control unit, i.e., the function computer.

The functions that guarantee the control function, i.e., the actual control tasks and system-specific watchdog functions of the input quantities and the output stages, may be allocated to level 1. The functionality for data transmission when using a CAN bus system, for example, may be also accommodated in level 1. This is represented by 14 in FIG. 1. Input quantities may be sent to the controllers over input lines 18 through 22 via input circuits 16 of measurement devices, e.g., sensors or actuators. Calculation of the control functions is based on these input quantities. Therefore, the input quantities may be made available to the programs of level 1. The programs of the first level form controlled variables on the basis of the input quantities and output these controlled variables to respective output stages 28 and 30 via output lines 24 and 26. In the example embodiment, controller 1 may be a controller for controlling an internal combustion engine, output stages 28 being output stages for controlling injectors and ignition devices, etc., i.e., engine electronic systems and motronic output stages. In the example embodiment, output stage 30 may be, for example, an output stage for actuation of an electrically operable throttle valve of the internal combustion engine. Depending on the application, controller or control unit 10 controls output stages for actuation of clutches of an automatic transmission, brake control devices, etc.

Reference is made at this point to German Published Patent Application No. 44 38 714 A1 as the background or the starting point of the present invention. As is known from German Published Patent Application No. 44 38 714 A1, programs 32 which monitor the functional reliability of the programs of the first level and thus the functional reliability of the control function may be allocated to the second level 2 (or II).

In the example embodiment of the present invention, this may be implemented on the basis of input and output quantities. Thus, the input signals of lines 18 through 22 may be sent redundantly to the programs of the second program level or level II, and the output quantities or state variables of the programs may also be sent to the first program level or level I over lines 34 through 38. By comparing these quantities or quantities derived from them, the programs of the second level ascertain the functional reliability or a malfunction of the programs of the first level. To ensure operational reliability, at least one of the output stages—output stage 30 in the example of control unit 10—may be isolated over an output line 40 by the programs of the second level II in the error-free case or may be disconnected in the event of an error.

Third program level III includes programs that check the functional reliability of the programs of level II as well as of components of the computer. As illustrated in FIG. 1, third level III may be divided over function computer and watchdog module 11 or it may also be included completely in control unit 10, i.e., with an integrated watchdog module 11.

In the example illustrated here, however, the programs of this level II communicate with external components as part of the monitoring, namely with the watchdog module in the related art cited above.

Level III includes programs such as memory test programs 42, programs for debugging function 44 and optionally also programs for external device testing. In the related art which is cited above and which describes a single monitoring of a controller, the programs of the debugging function of level III may be connected to the watchdog module. A watchdog function may be ensured by inquiry/response communication 13, 14 with debugging function 44 and downstream memory test 42. For redundant security, watchdog module 11 or corresponding programs 11a then send a permission signal to output stage 30 over line 12 or send an enable to motronic output stage 28.

Figure 2:
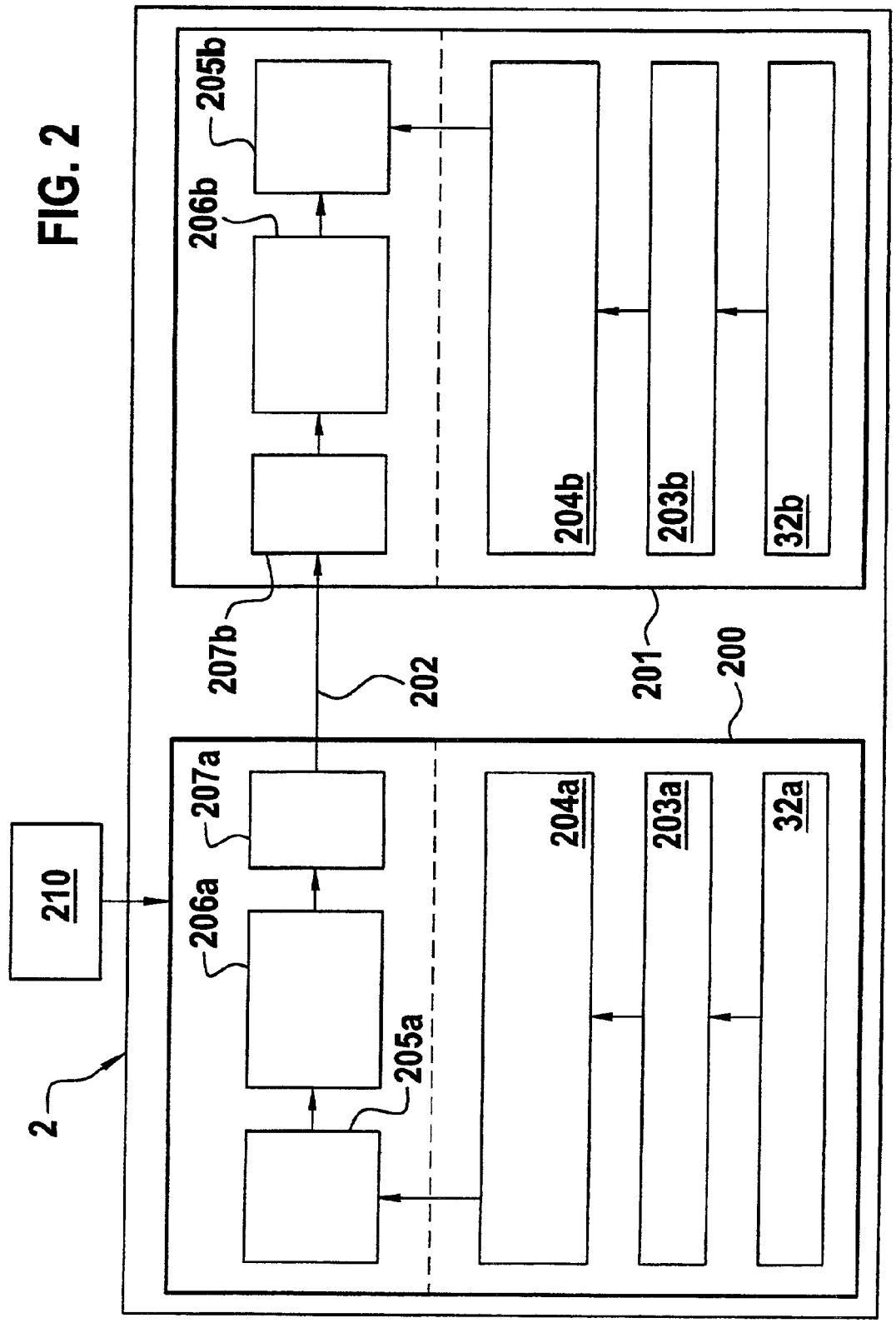
FIG. 2 illustrates a controller interconnection and the expansion according to the present invention into program levels 1 and 2 for the singular connection of one component.

This watchdog concept will now be expanded in FIG. 2 according to the present invention. First controller 200, e.g., the transmitting or master controller, may be a connection to certain components 210 which the slave controller(s), i.e., second controllers 201, does/do not have. The information from these components 210 may be branched off at an appropriate location for the second controllers, i.e., for receiving or slave controllers 201. It is important here that errors in master controller 200 do not lead to an undetected power increase in slave controller 201. There is thus a master controller 200 connected to component 210 in controller interconnection 2, i.e., in the multiple controller concept; these components may be present only once and should not or may not be input in parallel, such as a pedal sensor.

Then a data packet may be compiled in master controller 200 from watchdog function 32a. The watchdog function makes available secured RAM information, i.e., data from main memory 203a. Then the send message may be compiled with special security information and a message counter 204a. This takes place in program level II. Then on the example of the connection over the CAN bus, the send message together with the security information and message counter may be filed in main memory buffer for CAN message 205a. Then the message having the corresponding data content may be transmitted to the receiving controller, the second controller or slave controller 201 over connection 202, for example the CAN bus, via the CAN operation for sending 206a and the block CAN having DPRAM 207a. Functionalities 205a, 206a and 207a may be filed in level I.

Then in level I of receiving controller 201, the CAN message may be received via block 207b, DPRAM, the CAN operation for receiving 206b and the main memory buffer for CAN message 205b. The received message may be analyzed in level II and checked to see whether it is up-to-date on the basis of the message counter and its consistency may be checked on the basis of the security information in 204b. The data then goes as secured main memory information to watchdog function 32b via block 203b, i.e., the analysis and checking take place in level II as part of the watchdog function.

Figure 3:
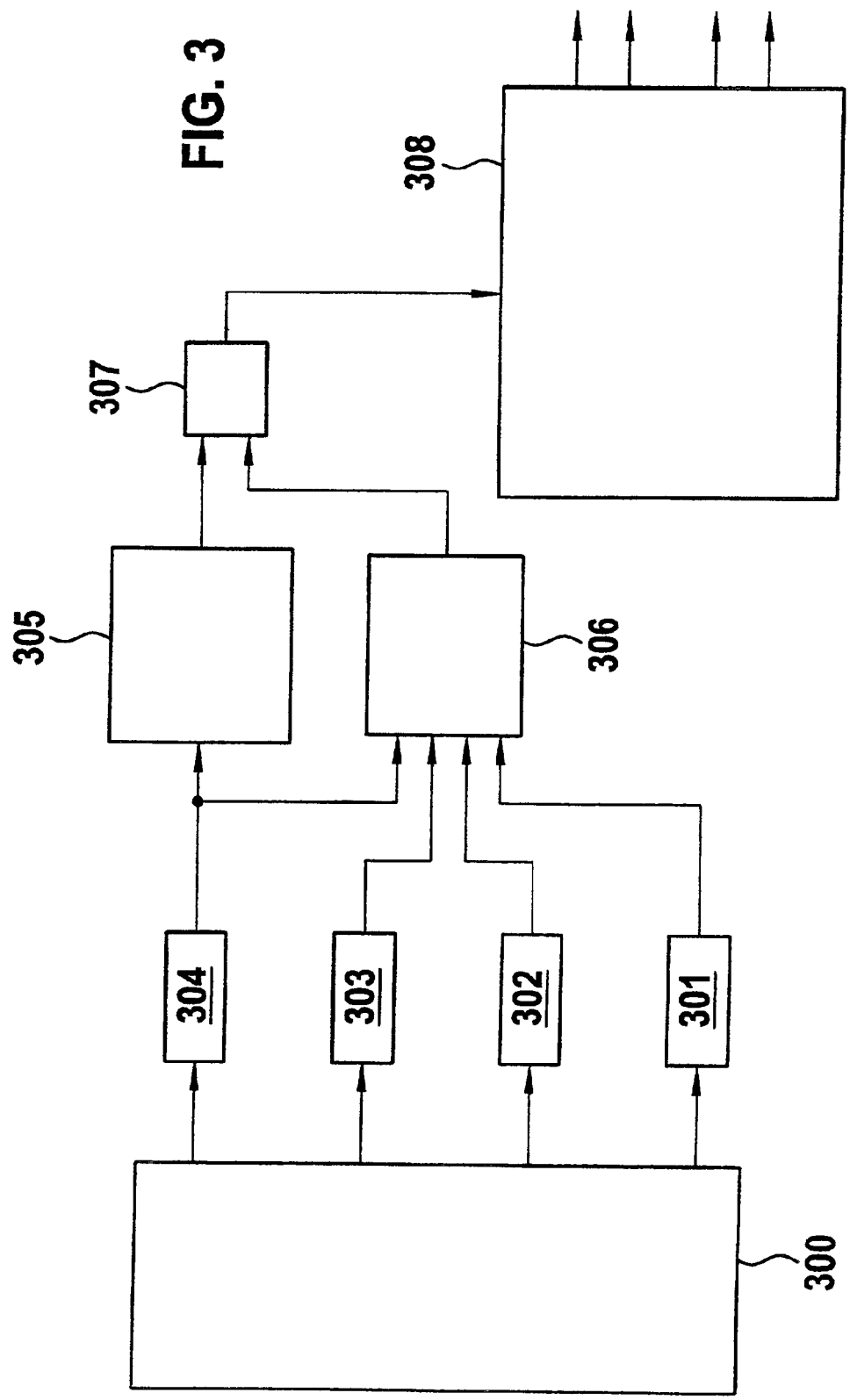
FIG. 3 illustrates the watchdog function and the error response on the basis of a concrete example including pedal setpoint input and cruise control (FGR).

This is illustrated again in FIG. 3 on the basis of a concrete example, i.e., the expansion of the watchdog concept of FIG. 1, as illustrated in FIG. 2, will now be explained on the basis of FIG. 3 in the concrete example of a pedal sensor and a cruise control FGR. The signal paths that are relevant for the watchdog function and the special security mechanisms are illustrated here. The transfer from the CAN buffer memory for the received message is illustrated in block 300. The message counters may be extracted from master 304, a pedal setpoint may be extracted from master 303, cruise control permission may be extracted from master (FGR permission) 302, and security information may be extracted from master 301.

The message counter difference may be analyzed in block 305. This means that the received message may be checked to see whether it is up-to-date. The security information may be checked in block 306. This may be represented as a checksum or check value via 302 through 304, as illustrated here, or it may also be represented as a check sum value over parts of the complete information, e.g., only 302 and 303.

The results of the message counter analysis, i.e., the check of whether it is up-to-date and the check of consistency in block 306, may be assessed in block 307. An example of such an analysis would be, for example, to pass the signals through an OR element, so that if an error is signaled by "1," then only when there is no error, no inactive values are preset in 308. If there is an error, symbolized by a "1," from one of blocks 305 or 306, then inactive values may be preset by use of the OR element, so that it may be possible to prevent a power increase in the slave controller.

These inactive values in block 308 may be, for example, the no-load input for the pedal setpoint or the denial of permission for the cruise control. The no-load input for the pedal setpoint and input of a zero torque as part of cruise control take place in level I. Thus two signal paths may be defined, first the signal path of the function in level I within the context of CAN messages, the pedal setpoint and a cruise control setpoint torque being transmitted as part of CAN messages in this example embodiment. A message interruption in the function may be recognized in level I by analysis of status information of CAN messages in the CAN DPRAM, leading to the error response in the function of the no-load input for the pedal setpoint as mentioned above and zero torque input within the context of cruise control.

The second signal path of monitoring in level II is also in the CAN message, but with a message counter and security information, i.e., a message interruption in the watchdog function may be recognized here by analyzing the message counter for change. In signal path II, a pedal setpoint may be transmitted here as a redundant pedal setpoint, and permission for cruise control FRG may also be transmitted here. On detection of an error in the monitoring, the no-load input with regard to the redundant pedal setpoint and the classification of the cruise control as not permitted may occur as a response, so that the slave controller is converted to the secure state.

In addition, the effect of errors in master controller 200 may be considered within the context of the behavior of slave controller 201. A distinction may be made between the following cases from 1 through 4:

1. Errors which have an effect on the pedal setpoint, which is transmitted from the master controller to the slave controller:

These errors may be:

undervoltage in the master controller,

ADC error in the master controller (ADC=analog-digital converter), error detection in the pedal setpoint monitoring in the master controller in level II These errors lead to the following error response in the system:

no-load input in level I for master controller and slave controller, monitoring for no-load input in level II for master controller and slave controller, rotational speed limitation via an injection cutout with a currentless throttle valve output stage (30) in the master controller and no-load input in the slave controller.

2. Errors having effects on the cruise control input, which is transmitted from the master controller to the slave controller:

cruise control operating lever errors or message errors in cruise control signals via CAN, brake light switch errors, other errors leading to shutdown of the cruise control in level I, and error detection in monitoring of input information for cruise control monitoring in the master controller in level II.

These errors lead to the following error response in the system:

no cruise control setpoint torque in level I for master controller and slave controller, no cruise control permission in level II in master controller and slave controller, normal operation without cruise control in master controller and slave controller, errors leading to shutdown of cruise control being considered as an exception. These are accompanied by other error responses in the master controller.

3. Memory errors, main memory or read-only memory errors (RAM or ROM in the master controller) lead to the following error response in the system:

the memory test affected by the error is repeated in initialization of the master controller, the memory test detects the error and prevents normal operation.

The CAN connection in the master controller is not enabled.

The CAN messages from the master controller are not sent.

No CAN messages from the master controller are received in the slave controller.

Level I in the slave controller detects a message interruption via the status information in the descriptor bytes of the CAN messages and enters no load as the pedal setpoint and zero as the cruise control setpoint torque.

Level II in the slave controller detects "message counter stopped" and enters no load as the pedal setpoint for the monitoring and "cruise control not permitted" for the cruise control function.

Output stage shut down in the master controller.

No-load operation without cruise control in the slave controller, after final bounce time and rotational speed limitation via injection cutout.

4. Command or program debugging function errors in the master controller lead to the following possible error responses in the device:

The master controller does not send any messages to the slave controller.

CAN message interruption is detected in levels I and II in the slave controller, which responds with the inactive value input specified previously.

During the reset and initialization time, the master controller does not send any monitoring messages to the slave controller or does not send any valid but otherwise faulty monitoring messages.

Level II in the slave controller detects message errors and enters the inactive values in levels I and II.

During the reset and initialization time, the master controller does not send any messages to the slave controller which responds with input of inactive values.

Between the resets triggered cyclically by the watchdog module, the master controller may send valid messages to the slave controller. This is bridged by the persistent error effect, which is canceled only after detection of multiple error-free messages. Thus, the inactive input is permanently valid in levels I and II in the slave controller.

Thus in a multiple controller concept having a master controller to which are connected components that are present only once and whose data may not or should not be input in parallel, such as the pedal sensor, it may be possible to implement a multiple controller operation having a minimal hardware connection between the controllers, e.g., over only a CAN bus, while achieving the necessary safety standards. Certain elements, for example elements that determine performance, may nevertheless be connected to only one of the two controllers, and the defined monitoring according to the related art may be implemented over this connection.

What is claimed is:

1. A method of monitoring at least one of data and transmission of data between a first control unit and a second control unit, the two control units having a first program level, to which are allocated programs which calculate a control function, as well as a second program level including programs that monitor functional reliability of the programs of the first program level, the first control unit being connected to at least one component which is used to acquire data, comprising the steps of:
   transmitting at least one of the data acquired by the component and data derived from the data acquired by the component, from the first control unit to the second control unit over a single connection in a secure manner; and
   separating, in a secure manner, the at least one of the data and the data transmission in the first and second program levels such that errors in the at least one of the data and the data transmission are detected;
   wherein a second signal path, other than a first signal path of the first program level, is provided for monitoring in the second program level to protect data.

2. The method according to claim 1, wherein the single connection is a CAN bus.

3. The method according to claim 2, further comprising the step of:
   implementing security in the first program level by analysis of status information of a corresponding CAN message containing data that is on the CAN bus.

4. The method according to claim 1, further comprising the step of:
   implementing security in the second program level of the first control unit by adding security information to respective data and by using a message counter.

5. A method of monitoring at least one of data and transmission of data between a first control unit and a second control unit, the two control units having a first program level, to which are allocated programs which calculate a control function, as well as a second program level including programs that monitor functional reliability of the programs of the first program level, the first control unit being connected to at least one component which is used to acquire data, comprising the steps of:
   transmitting at least one of the data acquired by the component and data derived from the data acquired by the component, from the first control unit to the second control unit over a single connection in a secure manner;
   separating, in a secure manner, the at least one of the data and the data transmission in the first and second program levels such that errors in the at least one of the data and the data transmission are detected; and
   providing an error response, by which a more secure state is set in the second controller, when an error in the at least one of the data and the data transmission is detected.

6. The method according to claim 5, wherein the error is an interruption in the data transmission.

7. A device for monitoring at least one of data and transmission of data, comprising:
   first and second control units, the control units including a first program level, to which are allocated programs which calculate a control function, as well as a second program level including programs that monitor functional reliability of the programs of the first program level;
   a component for acquiring data, which component is connected to the first control unit, wherein at least one of the data acquired by the component and data derived from the data acquired by the component are transmitted from the first control unit to the second control unit over a single connection in a secure manner; and
   an arrangement which implements separate security for the at least one of the data and the data transmission in the first and second program levels such that errors in the at least one of the data and the data transmission are detected;
   wherein a second signal path, other than a first signal path of the first program level, is provided for monitoring in the second program level to protect data.

8. The method according to claim 1, further comprising:
   providing an error response, by which a more secure state is set in the second controller, when an error in the at least one of the data and the data transmission is detected.

9. The device according to claim 7, wherein the single connection is a CAN bus.

10. The device according to claim 9, wherein security is implemented in the first program level by analysis of status information of a corresponding CAN message containing data that is on the CAN bus.

11. The device according to claim 7, wherein security is implemented in the second program level of the first control unit by adding security information to respective data and by using a message counter.

12. The device according to claim 7, wherein an error response is provided, by which a more secure state is set in the second controller, when an error in the at least one of the data and the data transmission is detected.

13. The device according to claim 12, wherein the error is an interruption in the data transmission.

14. The method according to claim 8, wherein the error is an interruption in the data transmission.

* * * * *